(12) United States Patent
Zuzelski et al.

(10) Patent No.: US 11,480,273 B2
(45) Date of Patent: Oct. 25, 2022

(54) FLUID COUPLING

(71) Applicant: Eaton Intelligent Power Limited, Dublin (IE)

(72) Inventors: Chris Zuzelski, Clarklake, MI (US); Gary M. Jenski, Jr., Jackson, MI (US); William T. Flynn, Horton, MI (US); William H. Newsome, Dexter, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 334 days.

(21) Appl. No.: 16/535,475

(22) Filed: Aug. 8, 2019

(65) Prior Publication Data

US 2020/0049281 A1    Feb. 13, 2020

Related U.S. Application Data

(60) Provisional application No. 62/716,483, filed on Aug. 9, 2018.

(51) Int. Cl.
*F16L 59/065* (2006.01)
*F16L 19/02* (2006.01)
*F16L 59/18* (2006.01)

(52) U.S. Cl.
CPC ......... *F16L 19/0218* (2013.01); *F16L 59/065* (2013.01); *F16L 59/181* (2013.01)

(58) Field of Classification Search
CPC ... F16L 19/0218; F16L 59/065; F16L 59/181; F16L 19/0212; F16L 59/182; F16L 59/18
See application file for complete search history.

(56) References Cited

U.S. PATENT DOCUMENTS

| 1,337,427 | A | * | 4/1920 | Beach | F16L 19/0218 |
| | | | | | 285/353 |
| 3,003,798 | A | * | 10/1961 | Sandlin | E21B 33/1208 |
| | | | | | 523/400 |
| 3,170,667 | A | * | 2/1965 | Szohatzky | F16L 37/407 |
| | | | | | 285/914 |
| 3,195,935 | A | * | 7/1965 | Beebee | F16L 37/22 |
| | | | | | 285/316 |
| 3,352,576 | A | * | 11/1967 | Thorne-Thomsen | |
| | | | | | F16L 37/088 |
| | | | | | 285/321 |
| 3,712,583 | A | * | 1/1973 | Martindale | F16L 37/105 |
| | | | | | 251/149.6 |
| 3,916,488 | A | | 11/1975 | Gazda et al. | |
| 4,007,909 | A | * | 2/1977 | Buseth | F16L 29/007 |
| | | | | | 251/149.6 |

(Continued)

FOREIGN PATENT DOCUMENTS

| EP | 2639488 A1 | 9/2013 |
| WO | 88/08499 A1 | 11/1988 |
| WO | 13-030621 A1 | 3/2013 |

*Primary Examiner* — Zachary T Dragicevich
*Assistant Examiner* — James A Linford
(74) *Attorney, Agent, or Firm* — Merchant & Gould P.C.

(57) ABSTRACT

A fluid coupling includes a first adapter, a second adapter, an inner sleeve connected to the first adapter and the second adapter, a nut connected to the first adapter and the second adapter, a sealing member connected to one of the first adapter and the second adapter, and/or an outer sleeve connected to the nut. The outer sleeve may include a chamber provided between an inner wall of the outer sleeve and an outer wall of the outer sleeve.

27 Claims, 10 Drawing Sheets

(56) References Cited

U.S. PATENT DOCUMENTS

| | | | |
|---|---|---|---|
| 4,099,747 A * | 7/1978 | Meserole | F16L 59/188 |
| | | | 285/47 |
| 4,259,989 A | 4/1981 | Lalikos et al. | |
| 4,667,390 A * | 5/1987 | Acharya | F16L 59/065 |
| | | | 62/50.7 |
| 4,675,221 A | 6/1987 | Lalikos et al. | |
| 4,915,990 A * | 4/1990 | Chang | F16L 5/02 |
| | | | 174/DIG. 8 |
| 5,183,079 A | 2/1993 | Blin | |
| 5,985,385 A | 11/1999 | Gottfried | |
| 7,575,024 B2 | 8/2009 | Zeiber et al. | |
| 8,176,943 B2 | 5/2012 | Stroempl et al. | |
| 8,713,944 B2 | 5/2014 | Bleeker | |
| 8,960,726 B2 * | 2/2015 | Nick | F16L 19/005 |
| | | | 285/86 |
| 2008/0271797 A1 | 11/2008 | Zeiber et al. | |
| 2011/0000572 A1 | 1/2011 | Ramaswamy et al. | |
| 2013/0263960 A1 | 10/2013 | Cichorek et al. | |

* cited by examiner

FLUID COUPLING

CROSS-REFERENCE TO RELATED APPLICATIONS

This application claims priority to U.S. Provisional Patent Application No. 62/716,483, filed Aug. 9, 2018, which is hereby incorporated herein by reference in its entirety.

TECHNICAL FIELD

The present disclosure generally relates to fluid couplings, including quick-disconnect fluid couplings that may be used in high temperature environments.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid couplings may not be configured to withstand high temperatures for sufficient amounts of time. For example and without limitation, in high temperature environments, heat may be transferred relatively quickly to sealing members, which in some cases could permanently damage the sealing members and result in leaks.

There is a desire for solutions/options that minimize or eliminate one or more challenges or shortcomings of fluid couplings. The foregoing discussion is intended only to illustrate examples of the present field and should not be taken as a disavowal of scope.

SUMMARY

In embodiments, a fluid coupling may include a first adapter, a second adapter, an inner sleeve connected to the first adapter and the second adapter, a nut connected to the first adapter and the second adapter, a sealing member connected to one of the first adapter and the second adapter, and/or an outer sleeve connected to the nut. The outer sleeve may include a chamber provided between an inner wall of the outer sleeve and an outer wall of the outer sleeve.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
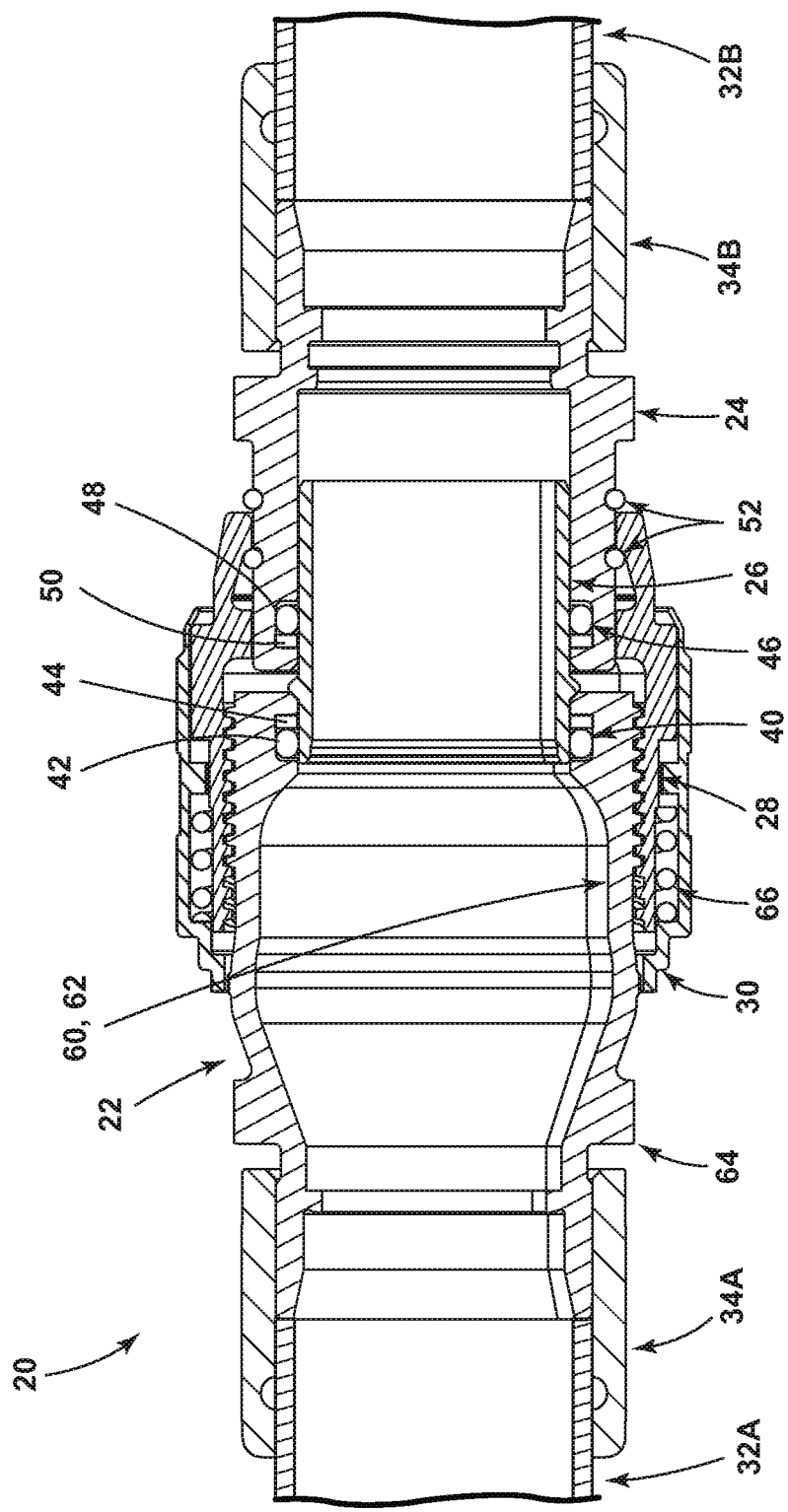
FIG. 1 is a cross-sectional view generally illustrating an embodiment of a fluid coupling according to teachings of the present disclosure.

In embodiments, such as generally illustrated in FIG. 1, a fluid coupling 20 may include a first adapter 22, a second adapter 24, an inner sleeve 26, a nut 28, and/or an outer sleeve 30.

With embodiments, the first adapter 22 and the second adapter 24 may be configured to connect the fluid coupling 20 with fluid conduits 32A, 32B, such as via connectors 34A, 34B (e.g., B nuts). The first adapter 22 may be configured as a male adapter and/or the second adapter 24 may be configured as a female adapter. The inner sleeve 26 may be disposed at least partially in the first adapter 22 and the second adapter 24. The inner sleeve 26 may be configured to provide and/or facilitate fluid communication between the first adapter 22 and the second adapter 24. A first sealing member 40 may be configured to provide a fluid seal between the inner sleeve 26 and the first adapter 22. The first sealing member 40 may be disposed at least partially in a recess 42 of the first adapter 22. A first back up ring 44 may be disposed in the recess 42 of the first adapter 22 (e.g., adjacent the first sealing member 40).

A second sealing member 46 may be configured to provide a fluid seal between the inner sleeve 26 and the second adapter 24. The second sealing member 46 may be disposed at least partially in a recess 48 of the second adapter 24 (e.g., an inner circumferential recess). A second back up ring 50 may be disposed in the recess 48 of the second adapter 24 (e.g., adjacent the second sealing member 46). Sealing members 40, 46 may, for example and without limitation, include elastomeric and/or polymeric materials. Sealing members 40, 46 may or may not be damaged if the sealing members reach temperatures of 500° F. or more.

In embodiments, a nut 28 may be configured to connect a first adapter 22 with a second adapter 24. For example and without limitation, a nut 28 may be connected to a second adapter 24 such that the nut 28 may be free to rotate about the second adapter 24 and axial movement of the nut 28 relative to the second adapter 24 may be restricted and/or substantially prevented (e.g., via one or more retainer rings 52). The nut 28 may be selectively connected to the first adapter 22. For example and without limitation, the nut 28 may include threads 60 (e.g., internal threads) that may be configured to engage with threads 62 (e.g., external threads) of the first adapter 22. Rotation of the nut 28 may cause the first adapter 22 and the second adapter 24 to move toward each other or come together (e.g., in an axial direction).

With embodiments, an outer sleeve 30 may at least partially cover a nut 28. The outer sleeve 30 may be connected to or with the nut 28 such that the outer sleeve 30 and the nut 28 may rotate together. The outer sleeve 30 may be configured to move (e.g., axially) relative to the nut 28. The outer sleeve 30 may include a closed position, such as generally illustrated in FIG. 1, in which the outer sleeve 30 may cover a portion of the first adapter 22 and/or restrict access to the first adapter 22 such that disconnecting the first adapter 22 from the nut 28 and/or the second adapter 24 may be restricted (e.g., the outer sleeve 30 may cover an external/outer hexagonal portion or wrench flats 64 of the first adapter 22). The outer sleeve 30 may include an open position in which the outer sleeve 30 covers less or none of the first adapter 22 and/or does not materially restrict access to the first adapter 22 (e.g., the outer sleeve 30 may not cover the hexagonal portion/wrench flats 64). A spring 66, such as a coil spring or other spring-like component, may bias the outer sleeve 30 toward the closed position. The spring 66 may be disposed at least partially between (e.g., radially) the nut 28 and the outer sleeve 30.

Figure 2:
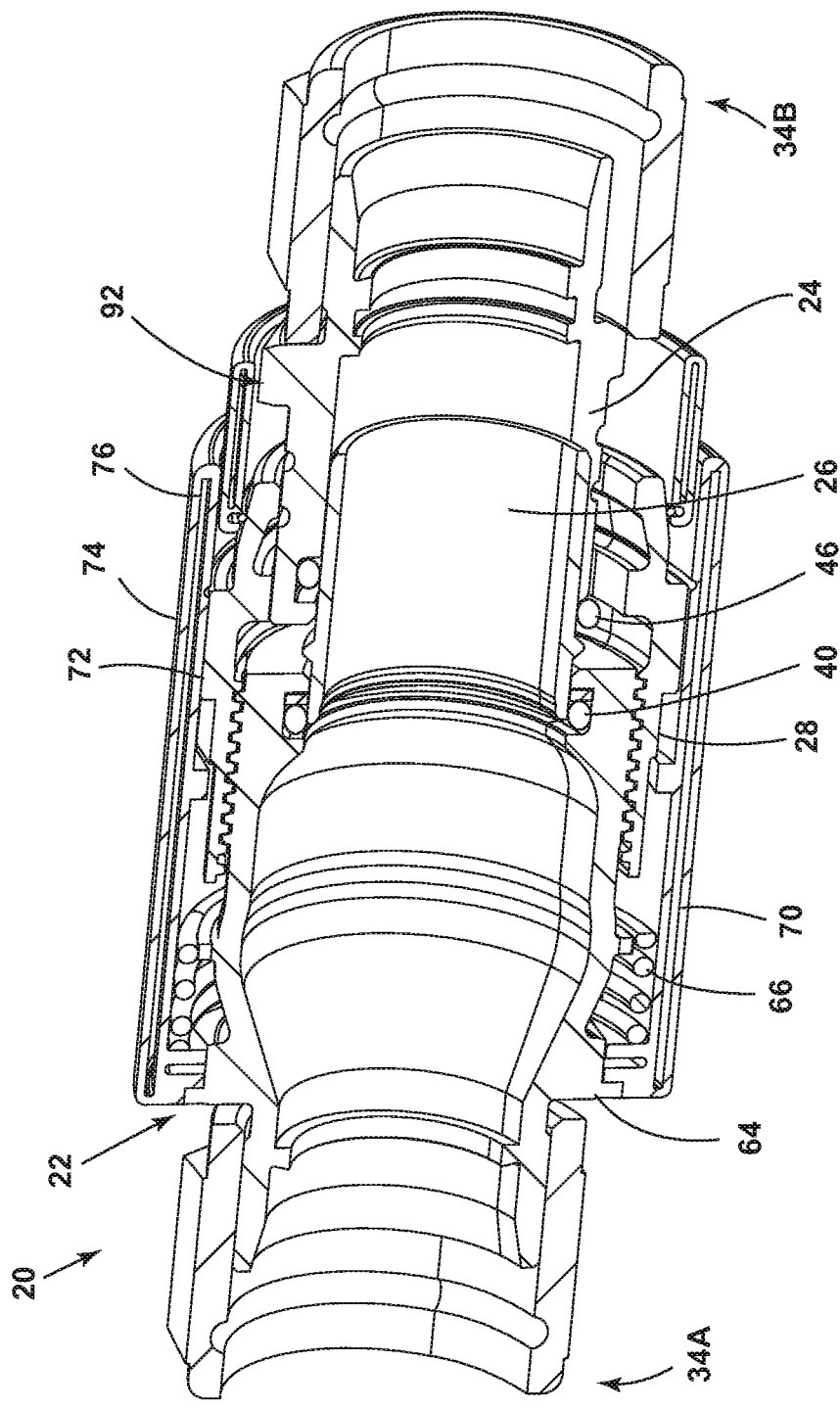
FIGS. 2 and 3 are cross-sectional perspective views generally illustrating embodiments of fluid couplings according to teachings of the present disclosure.

In embodiments, such as generally illustrated in FIG. 2, a fluid coupling 20 may include an outer sleeve 70 (e.g., instead of outer sleeve 30). The outer sleeve 70 may be configured to provide similar functionality as an outer sleeve 30. For example and without limitation, the outer sleeve 70 may be configured to selectively cover one or more portions of the first adapter 22, which may restrict or prevent disconnection of the first adapter 22 from the nut 28 or the second adapter 24. A spring or spring-like component (e.g., spring 66) may bias the outer sleeve 70 toward a closed position, such as generally illustrated in FIG. 2.

Figure 3:
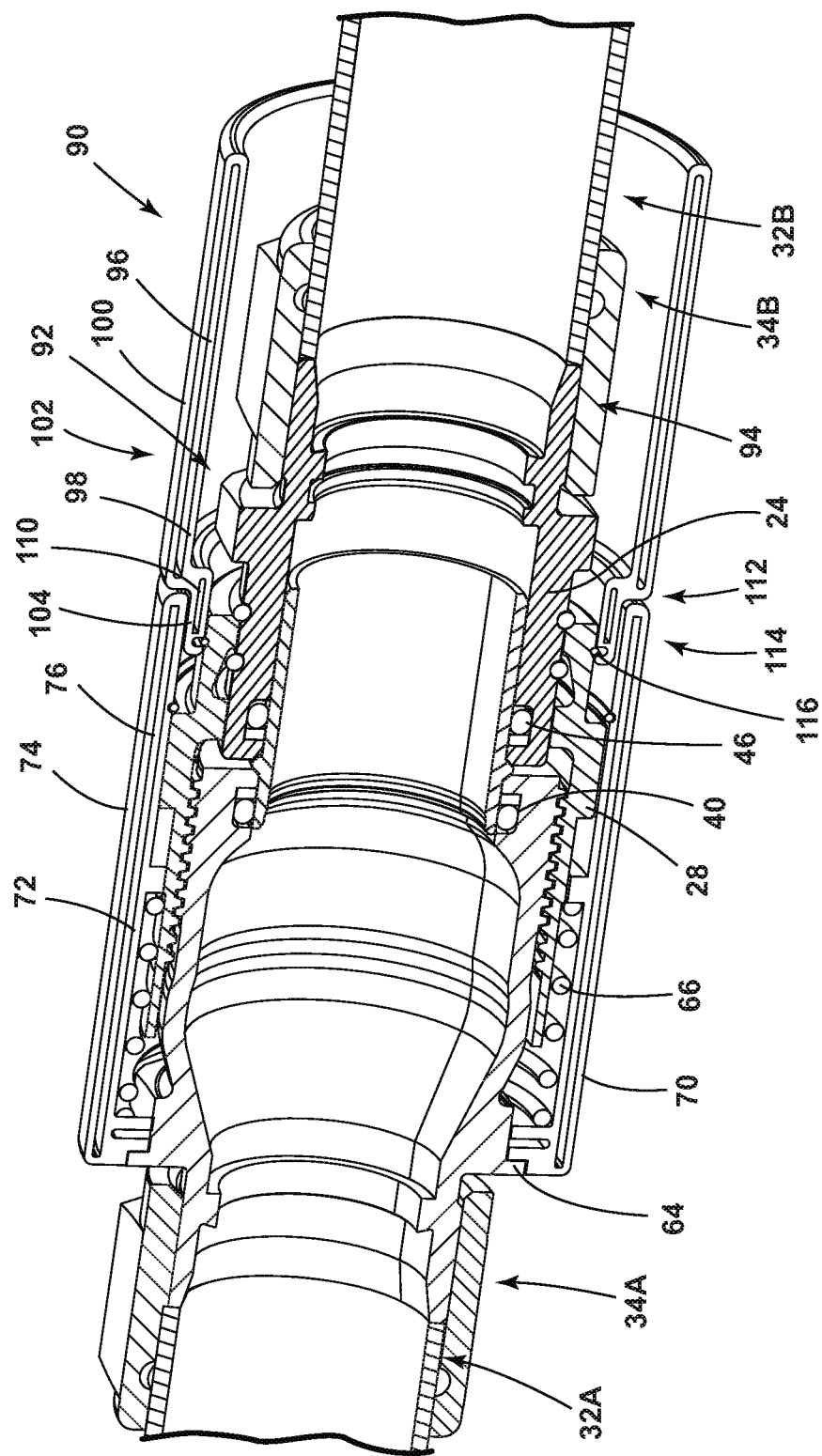
Figure 4:
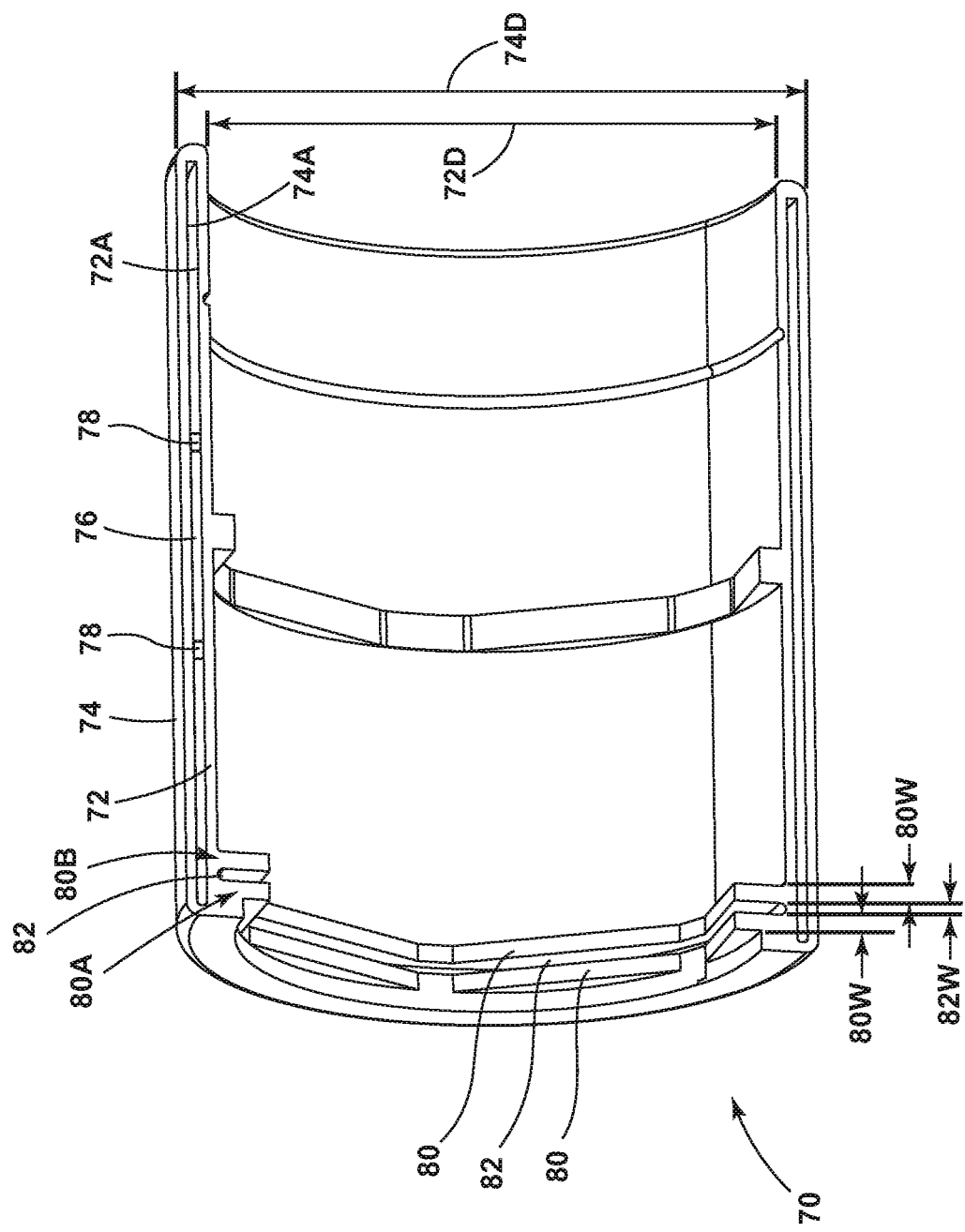
FIG. 4 is a cross-sectional perspective view generally illustrating an embodiment of an outer sleeve according to teachings of the present disclosure.

With embodiments, such as generally illustrated in FIGS. 2-4, an outer sleeve 70 may include an inner wall 72 and an outer wall 74. The inner wall 72 and/or the outer wall 74 may be metallic (e.g., corrosion resistant or CRES steel). An outer surface of the inner wall 72 and/or an inner surface of the outer wall 74 may include one or more low emissivity coatings 72A, 74A (e.g., gold). Some or all surfaces of an outer sleeve 70 may be polished, which may reduce heat transfer rates. The inner wall 72 and the outer wall 74 may, in at least some portions of the outer sleeve 70, be disposed at a distance from each other and/or a chamber 76 may be defined between the inner wall 72 and the outer wall 74. The chamber 76 may be filled, at least partially, with a fluid such as air. Alternatively, the chamber 76 may be at vacuum, substantially at vacuum, or at partial vacuum. The chamber 76 may provide thermal insulation for portions of a fluid coupling 20, such as portions disposed at least partially inside the outer sleeve 70, which may include the sealing members 40, 46. The chamber 76 may extend substantially around the outer sleeve 70 and/or along substantially an entire length of the outer sleeve 70. One or more supports 78 may be disposed in the chamber 76 and may be connected to the inner wall 72 and the outer wall 74.

With embodiments, such as generally illustrated in FIG. 4, an outer sleeve may include one or more wall portions 80 that may extend radially inward from an inner wall 72 of the outer sleeve 70. The wall portions 80 may include one or more of a variety of shapes, sizes, and/or configurations. For example and without limitation, an outer sleeve 70 may include 12 wall portions and/or one or more wall portions 80 may include a circle segment shape (e.g., with a rounded side and a straight side).

In embodiments, an outer sleeve 70 may include a first set of wall portions 80A and/or a second set of wall portions 80B. The first set of wall portions 80A may be axially spaced from the second set of wall portions 80B. For example and without limitation, the first set of wall portions 80A and the second set of wall portions 80B may at least partially define a circumferential slot 82 therebetween. In embodiments, the slot 82 may be continuous or substantially continuous about in an inner surface of the outer sleeve 70. The slot 82 may provide a thermal barrier or obstruction that may limit heat transfer from an outside of the outer sleeve 70 (e.g., at the first set of wall portions 80A) to the inside of the outer sleeve 70 (e.g., to the second set of wall portions 80B and/or other portions of the fluid coupling 20). Additionally or alternatively, the slot 82 may reduce a contact area between the outer sleeve 70 and the first adapter 22, which may reduce the direct conduction rate of heat transfer between the outer sleeve 70 and the first adapter 22. An axial width 82W of the slot 82 may, for example, be less than axial widths 80W of the wall portions 80. A radial extent of the slot 82 may vary circumferentially. For example and without limitation, a radial extent of the slot 82 may be larger at or near middle sections of the wall portions 80 and may be smaller between circumferentially adjacent wall portions 80. Two or more circumferentially adjacent wall portions 80 may be connected to each other, such as in a circumferential direction, and/or two or more circumferentially adjacent wall portions 80 may be spaced from each other, at least to some degree.

In embodiments, a first set of wall portions 80A may, for example, include six wall portions 80, and/or a second set of wall portions 80B may, for example, include six wall portions 80. In embodiments, inner surfaces of the wall portions 80 may be straight and/or wall portions 80 may be disposed to provide the outer sleeve 70 with a hexagonal inner surface that may be configured to engage a hexagonal outer portion/surface 64 of the first adapter 22.

With embodiments, wall portions 80 may, individually and/or collectively, include a relative small or minimized surface area (e.g., viewed from an axial direction). For example and without limitation, a total surface area of all wall portions 80 (e.g., of a first set of wall portions 80A) may be 10% or less of a surface area of a circle defined by an inner surface of the outer sleeve 70 adjacent the wall portions 80. Minimizing surface areas of wall portions 80 may minimize the area through which heat may be conducted through the outer sleeve 70 and/or may reduce external heat ultimately transferred to other portions of a fluid coupling 20, such as to the sealing members 40, 46.

In embodiments, such as generally illustrated in FIGS. 2 and 3, a fluid coupling 20 may include a second outer sleeve 90. The second outer sleeve 90 may be configured to cover and/or thermally insulate one or more portions of a fluid coupling 20, such as, for example, portions not covered by the outer sleeve 70. For example and without limitation, a second outer sleeve 90 may cover a middle section 92 of the second adapter 24 (see, e.g., FIG. 2) and/or an outer end 94 of the second adapter 24 (see, e.g., FIG. 3). As generally illustrated in FIG. 3, a second outer sleeve 90 may be configured to at least partially cover a connector 34B and/or a fluid conduit 32B.

With embodiments, such as generally illustrated in FIGS. 2-4, a second outer sleeve 90 may include a chamber 96 that may be defined between an inner wall 98 and an outer wall 100 of the second outer sleeve 90. The chamber 96 may be configured in a similar manner as the chamber 76 of the outer sleeve 70.

Figure 5:
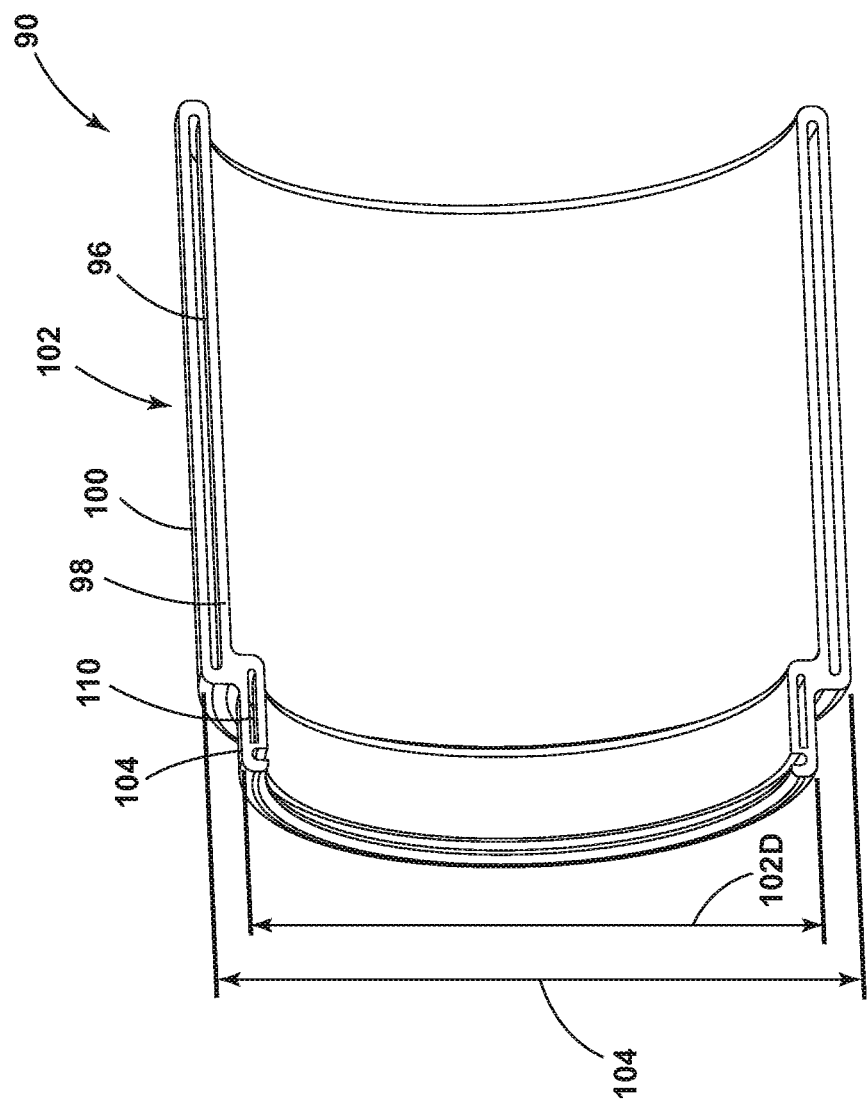
FIG. 5 is a cross-sectional perspective view generally illustrating an embodiment of a second outer sleeve according to teachings of the present disclosure.

In embodiments, such as generally illustrated in FIGS. 3 and 5, a second outer sleeve 90 may include a first/outer portion 102 and a second/inner portion 104. The first portion 102 of the second outer sleeve 90 may include the chamber 96 and/or the second portion 104 of the second outer sleeve 90 may include a second chamber 110 that may or may not be in fluid communication with the chamber 96. The first portion 102 and the second portion 104 may be disposed in a stepped configuration such that an outer diameter 102D of the first portion 102 is greater than an outer diameter 104D of the second portion 104 (see, e.g., FIG. 5). The outer diameter 104D of the second portion 104 may be about the same as or smaller than an inner diameter 72D of the inner wall 72 of the outer sleeve 70 (see, e.g., FIGS. 4 and 5). In a connected configuration, the second portion 104 may be disposed at least partially within (e.g., radially) the outer sleeve 70 (see, e.g., FIG. 3). The outer diameter 102D of the first portion 102 may be about the same as the outer diameter 74D of the outer wall 74 of the outer sleeve 70. In a connected configuration, an end 112 of the first portion 102 may be disposed adjacent an end 114 of the outer sleeve 70 such that, in a connected configuration of the second outer sleeve 90, the second outer sleeve 90 may restrict axial movement of the outer sleeve 70.

With embodiments, a second outer sleeve 90 may be configured for a snap connection with the nut 28. For example and without limitation, the second outer sleeve 90 may be configured to snap into and out of engagement with the nut 28. While connected/engaged with the nut 28, the second outer sleeve 90 may cover some or most of the second adapter 24, a fluid conduit 32B, and/or a connector 34B. The second outer sleeve 90 may cover the second adapter 24 such that the second adapter 24 is not accessible and/or cannot be easily actuated. To actuate the second adapter 24 (e.g., to disconnect the first adapter 22 and the second adapter 24), the second outer sleeve 90 may be removed, such as via snapping/unsnapping the second outer sleeve 90 out of engagement with the nut 28. The nut 28 may include a snap ring 116 that may facilitate a snap connection with the second outer sleeve 90. The snap ring 116 may be integrated with the nut 28 or may be a separate component connected to the nut 28.

Figure 6:
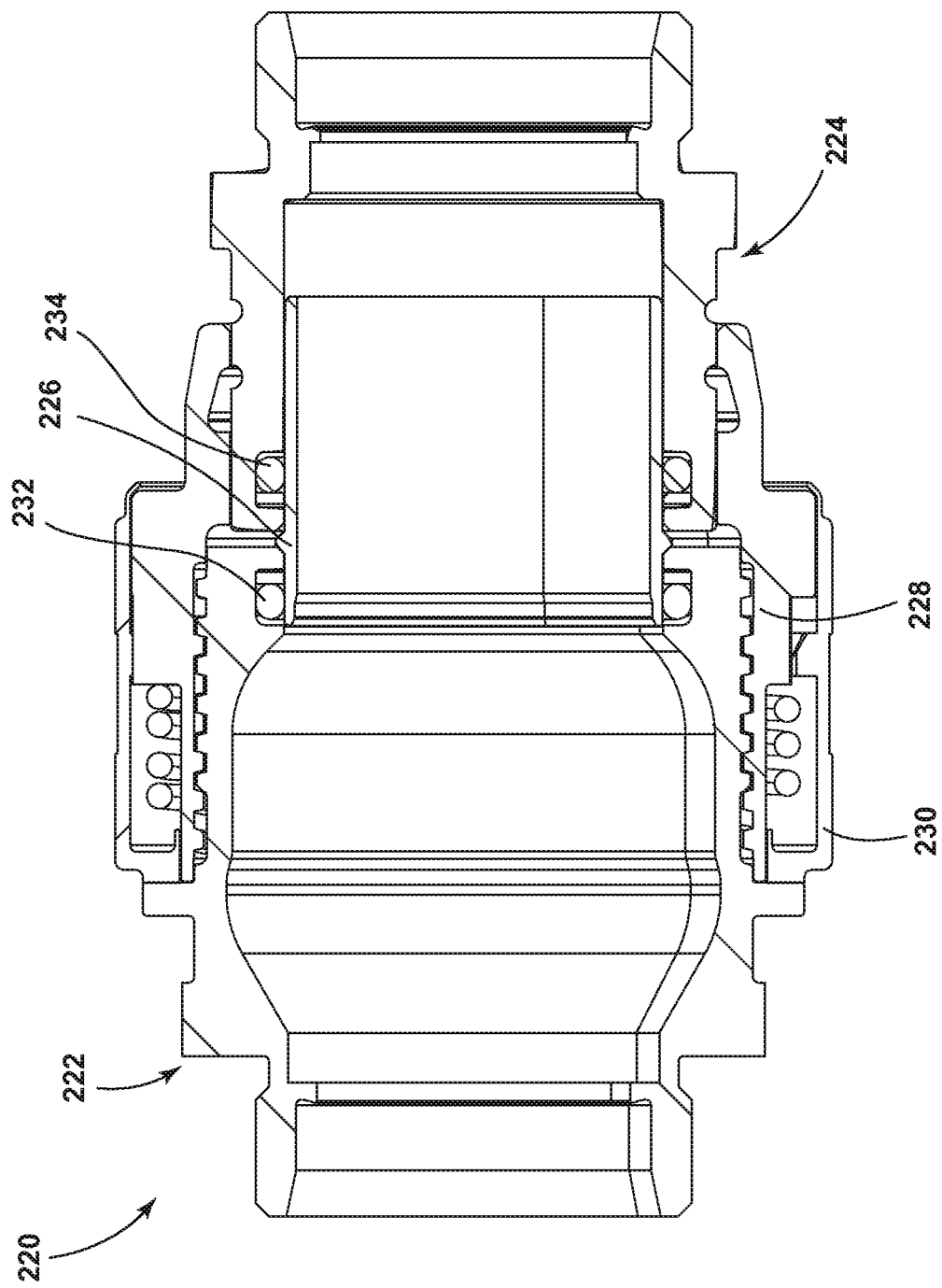
FIG. 6 is a cross-sectional view generally illustrating an embodiment of a fluid coupling according to teachings of the present disclosure.

In embodiments, such as generally illustrated in FIG. 6, a fluid coupling 220 may include a first adapter 222, a second adapter 224, an inner sleeve 226, a nut 228, an outer sleeve 230, a first sealing member 232, and/or a second sealing member 234. The first adapter 222, the second adapter 224, the inner sleeve 226, the nut 228, the outer sleeve 230, the first sealing member 232, and/or the second sealing member 234 may include similar configurations as and/or provide similar functionality as the first adapter 22, a second adapter 24, an inner sleeve 26, a nut 28, the outer sleeve 30, the first sealing member 40, and the second sealing member 46, respectively, of the fluid coupling 20.

Figure 7:
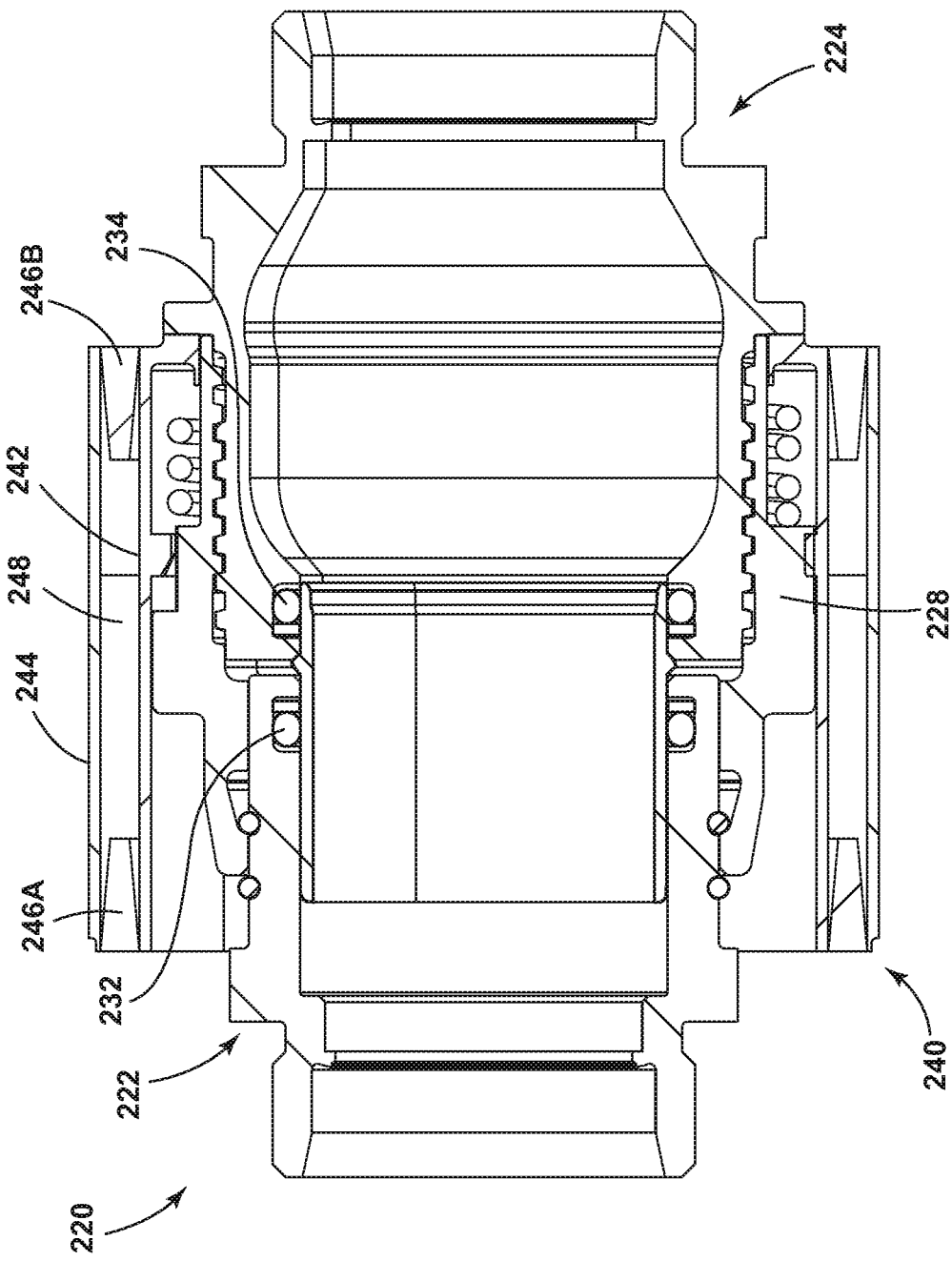
FIG. 7 is a cross-sectional view generally illustrating an embodiment of a fluid coupling according to teachings of the present disclosure.

With embodiments, such as generally illustrated in FIG. 7, a fluid coupling 220 may include an outer sleeve 240 (e.g., instead of the outer sleeve 230) that may include an inner wall 242 and an outer wall 244. The inner wall 242 and the outer wall 244 may be connected and/or sealed together via one or more plugs (e.g., plugs 246A, 246B). For example and without limitation, the inner wall 242 and the outer 244 wall may be sealed/connected at a first axial end via a first silicone plug 246A and/or may be sealed/connected at a second axial end via a second silicone plug 246B. The first plug 246A and the second plug 246B may include a tapered or wedge-shaped configuration, which may include the radial thickness of a plug 246A, 246B being greatest at the outside and decreasing toward a middle of the outer sleeve 240. The plugs 246A, 246B may thermally insulate the outer wall 244 from the inner wall 242, at least to some degree, and/or may include a lower thermal conductivity than the inner wall 242 and/or outer wall 244, which may be metallic.

In embodiments, the inner wall 242, the outer wall 244, the first plug 246A, and/or the second plug 246B may define a chamber 248 therebetween. The chamber 248 may be a fluid chamber that may contain one or more fluids. The chamber 248 may provide thermal insulation for one or more portions of a fluid coupling 220. As generally illustrated in FIG. 7, the chamber 248 may be sealed and may include an insulating fluid, such as air, or may be at vacuum, substantially at vacuum, or at partial vacuum. The vacuum or partial vacuum may be applied during insertion/connection of the plugs 246A, 246B with the inner wall 242 and outer wall 244. A partial vacuum in the chamber 248 may be sufficiently strong such that the fluid pressure in the chamber 248 at typical flame temperatures does not push out the plugs 246A, 246B.

Figure 8:
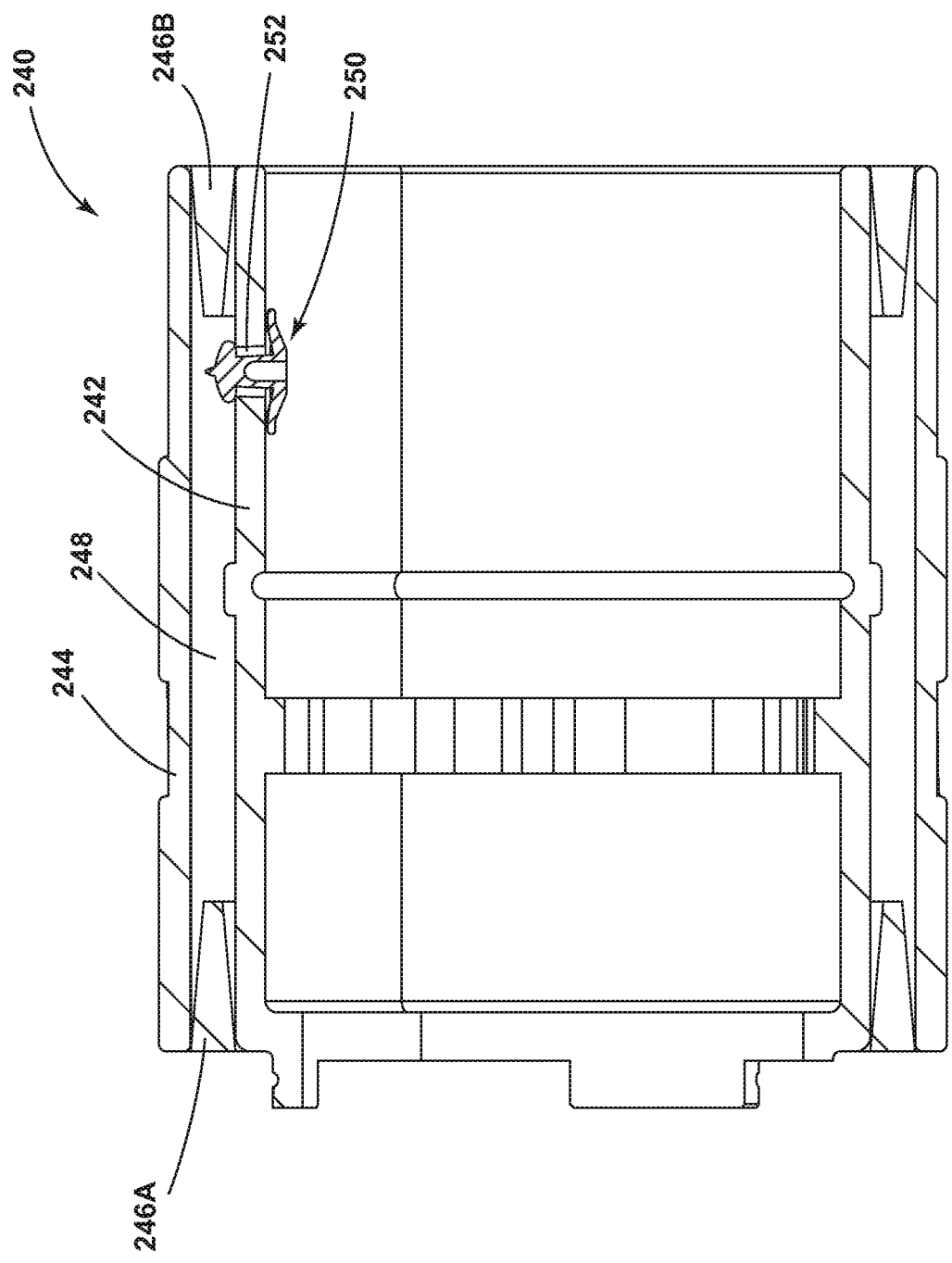
FIG. 8 is a cross-sectional view generally illustrating an embodiment of an outer sleeve according to teachings of the present disclosure.
Figure 9:
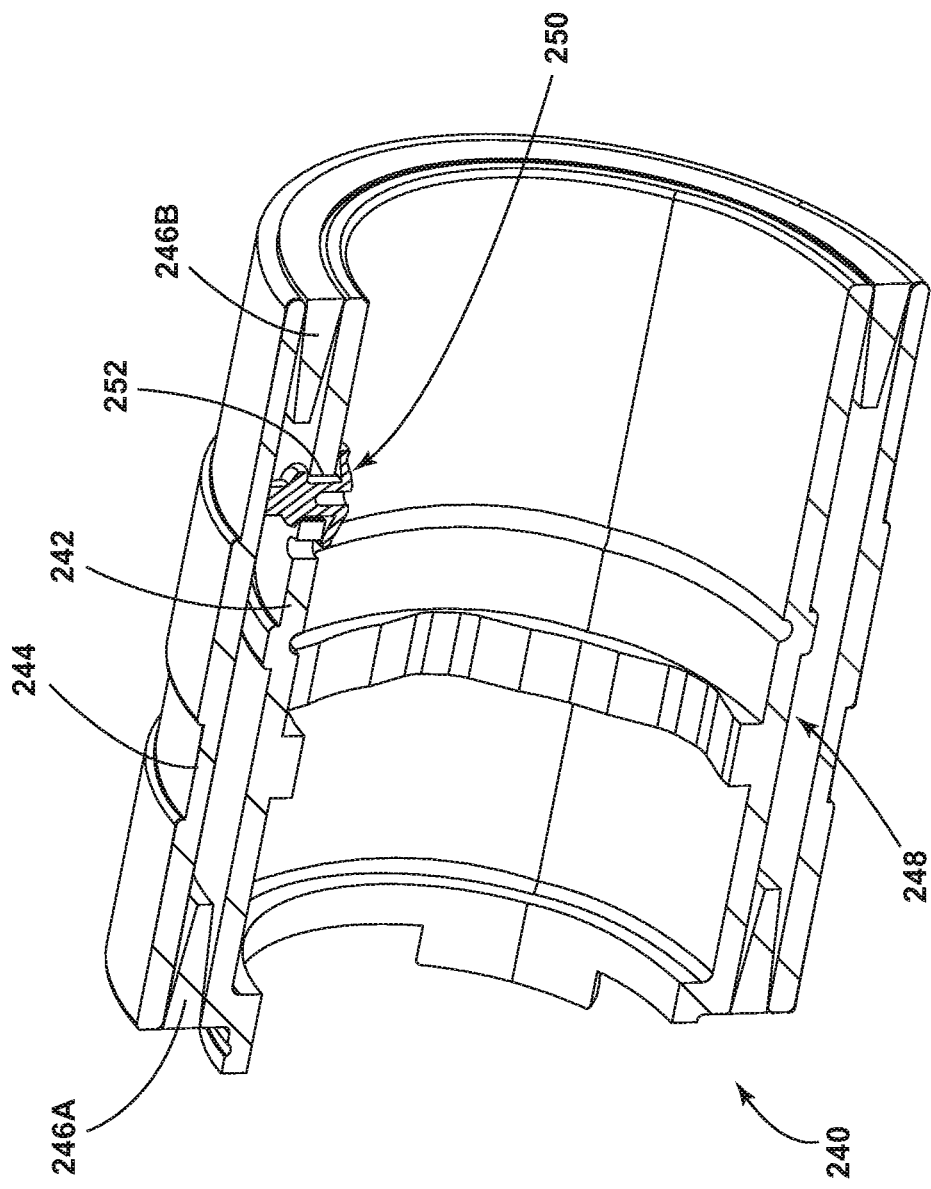
FIGS. 9 and 10 are cross-sectional perspective views generally illustrating embodiments of outer sleeves according to teachings of the present disclosure.

With embodiments, such as generally illustrated in FIGS. 8 and 9, an outer sleeve 240 may include an umbrella plug 250. The inner wall 242 may include a perforation or aperture 252 and the umbrella plug 250 may be inserted into the aperture 252 or otherwise connected therein. A partial vacuum may be pulled from the chamber 248 via the umbrella plug 250, such as after assembly (e.g., after insertion of the plugs), which may facilitate assembly of the fluid coupling 220. For example and without limitation, an entire outer sleeve 240 and/or an entire fluid coupling 220 may be disposed in a reduced pressure chamber and fluid/air may naturally vent through the umbrella plug 250. The umbrella plug 250 may automatically seal and/or prevent decay of the vacuum after the assembly is removed from the reduced pressure chamber.

Figure 10:
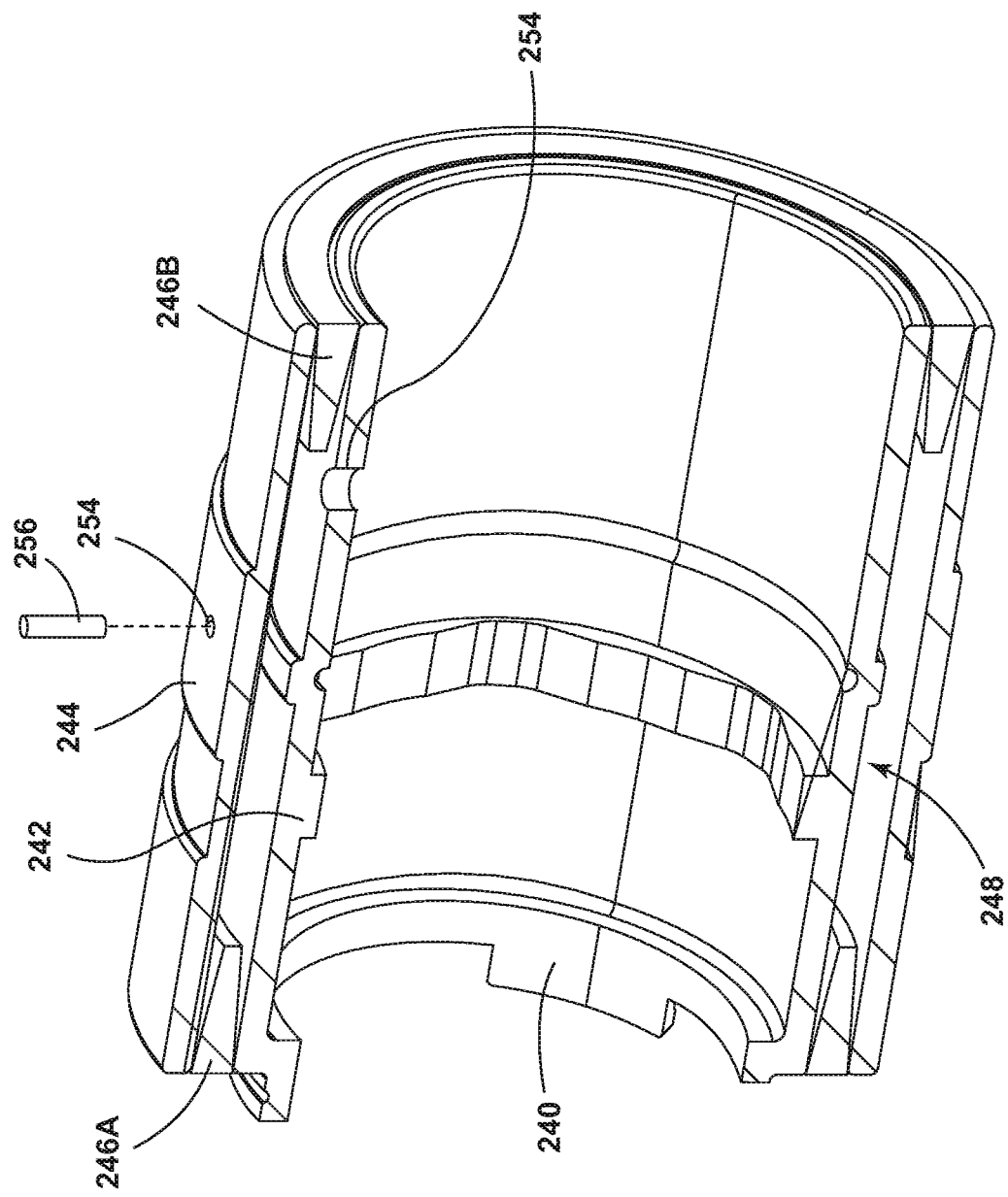

In embodiments, such as generally illustrated in FIG. 10, one or both of the inner wall 242 and the outer wall 244 may include one or more vents 254 (e.g., apertures), such as if the chamber 248 is not at least partially at vacuum. As the temperature around a fluid coupling 220 rises, the temperature of the fluid in the chamber 248 may rise, which may tend to increase the fluid pressure in the chamber 248. The vent(s) 254 may be configured to relieve, at least to some extent, such increased pressure, which may avoid the plugs 246A, 246B being pushed out at higher temperatures and/or pressures. With embodiments, a plug 256, such as a thermoplastic plug, may be disposed in a vent 254. The plug 256 may melt at a low enough temperature to allow high pressure fluid to flow out of the chamber 248 through the vent 254 and prevent the plugs 246A, 246B from being pushed out of the outer sleeve 240. Additionally or alternatively, an umbrella plug 250 (see, e.g., FIGS. 8 and 9) may be disposed in or connected to a vent 254. The umbrella plug 250 may relieve high pressure fluid from the chamber 248 as needed (e.g., if the pressure in the chamber 248 exceeds a predetermined threshold).

In embodiments, a fluid coupling 20, 220 may be configured as a quick-disconnect coupling. In embodiments, a fluid coupling 20, 220 may be configured to meet and/or exceed one or more standards for fire resistance and fire proof testing, such as, for example and without limitation, Aerospace Standard (AS) 1055. With embodiments, a fluid coupling 20, 220 may be configured such that sealing members (e.g., sealing members 40, 46, 232, 234, which may be elastomeric and/or polymeric sealing members) may not be damaged for at least 15 minutes if the fluid coupling is exposed to temperatures of 2000° F. or more (e.g., with no flow though the fluid coupling), which may involve the sealing members remaining at temperatures of about 450° F. or below for at least 15 minutes.

It should be understood that certain components (e.g., internal valves) may not be shown for simplicity.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fluid coupling, comprising:
   a first adapter;
   a second adapter;
   an inner sleeve connected to the first adapter and the second adapter;
   a nut connected to the first adapter and the second adapter;
   a sealing member connected to one of the first adapter and the second adapter; and
   an outer sleeve connected to the nut, the outer sleeve including a chamber provided between an inner wall of the outer sleeve and an outer wall of the outer sleeve;
   wherein the outer sleeve is disposed at least partially around the first adapter and the second adapter.

2. The fluid coupling of claim 1, wherein the chamber is sealed and at partial vacuum.

3. The fluid coupling of claim 1, wherein the outer sleeve is configured to shield the sealing member from heat such that the sealing member is not deformed for at least 15 minutes if the fluid coupling is subject to temperatures of 2000° F. or greater.

4. The fluid coupling of claim 1, further including a second outer sleeve connected to the nut, the second outer sleeve including a fluid chamber.

5. The fluid coupling of claim 4, wherein the second outer sleeve extends axially beyond the second adapter.

6. The fluid coupling of claim 4, wherein the second outer sleeve is connected to the nut via a snap connection.

7. The fluid coupling of claim 4, wherein a portion of the second outer sleeve is disposed radially inside of the outer sleeve.

8. The fluid coupling of claim 4, wherein outer diameters of the outer sleeve and the second outer sleeve are substantially the same.

9. The fluid coupling of claim 4, wherein the second outer sleeve includes an inner portion and an outer portion disposed in a stepped configuration; the outer portion includes the fluid chamber; and the inner portion includes a second fluid chamber, independent of the fluid chamber.

10. The fluid coupling of claim 1, further including an umbrella plug disposed in the inner wall of the outer sleeve.

11. The fluid coupling of claim 1, wherein the outer wall of the outer sleeve includes one or more vents.

12. The fluid coupling of claim 1, wherein the outer sleeve includes a circumferential slot defined between a plurality of radially-extending wall portions.

13. The fluid coupling of claim 12, wherein the plurality of radially extending wall portions provides the outer sleeve with a hexagonal inner surface engaged with a hexagonal outer surface of the first adapter.

14. The fluid coupling of claim 12, wherein at least one of the radially-extending wall portions includes a segment configuration.

15. The fluid coupling of claim 12, wherein the plurality of radially-extending wall portions includes a first set of radially-extending wall portions axially-spaced from a second set of radially-extending wall portions.

16. The fluid coupling of claim 15, wherein a total surface area of the first set of radially-extending wall portions is less than 10% of a surface area of a circle defined by an inner surface of the outer sleeve.

17. The fluid coupling of claim 1, wherein the outer sleeve is disposed at least partially around the nut, the inner sleeve, and a second outer sleeve.

18. The fluid coupling of claim 1, wherein the chamber extends along substantially an entire length of the outer sleeve.

19. The fluid coupling of claim 1, wherein the inner wall of the outer sleeve is connected to the outer wall of the outer sleeve via a plurality of silicone plugs.

20. A fluid coupling, comprising:
a first adapter;
a second adapter;
an inner sleeve connected to the first adapter and the second adapter;
a nut connected to the first adapter and the second adapter;
a sealing member connected to one of the first adapter and the second adapter; and
an outer sleeve connected to the nut, the outer sleeve including a fluid chamber;
wherein the outer sleeve is disposed at least partially around the first adapter and the second adapter.

21. The fluid coupling of claim 20, further including a second outer sleeve connected to the nut, the second outer sleeve including a chamber provided between an inner wall of the second outer sleeve and an outer wall of the second outer sleeve.

22. A sleeve for a fluid coupling, the sleeve comprising:
an inner wall;
an outer wall; and
a plurality of radially-extending wall portions extending from the inner wall;
wherein a circumferential slot is defined by the plurality of radially-extending wall portions;
wherein the plurality of radially extending wall portions provide the sleeve with a hexagonal inner surface configured for engagement with a hexagonal outer surface of an adapter.

23. The sleeve of claim 22, wherein the plurality of radially-extending wall portions includes a first set of radially-extending wall portions axially-spaced from a second set of radially-extending wall portions.

24. The sleeve of claim 22, wherein at least one of the radially-extending wall portions includes a segment configuration.

25. A fluid coupling, comprising:
a first adapter;
a second adapter;
an inner sleeve connected to the first adapter and the second adapter;
a nut connected to the first adapter and the second adapter;
a sealing member connected to one of the first adapter and the second adapter; and
an outer sleeve connected to the nut, the outer sleeve including a chamber provided between an inner wall of the outer sleeve and an outer wall of the outer sleeve;
wherein the chamber is sealed and at partial vacuum.

26. A fluid coupling, comprising:
a first adapter;
a second adapter;
an inner sleeve connected to the first adapter and the second adapter;
a nut connected to the first adapter and the second adapter;
a sealing member connected to one of the first adapter and the second adapter; and
an outer sleeve connected to the nut, the outer sleeve including a chamber provided between an inner wall of the outer sleeve and an outer wall of the outer sleeve;
wherein the outer sleeve is configured to shield the sealing member from heat such that the sealing member is not deformed for at least 15 minutes if the fluid coupling is subject to temperatures of 2000° F. or greater.

27. A fluid coupling, comprising:
a first adapter;
a second adapter;
an inner sleeve connected to the first adapter and the second adapter;
a nut connected to the first adapter and the second adapter;
a sealing member connected to one of the first adapter and the second adapter; and
an outer sleeve connected to the nut, the outer sleeve including a chamber provided between an inner wall of the outer sleeve and an outer wall of the outer sleeve;
wherein the inner wall of the outer sleeve is connected to the outer wall of the outer sleeve via a plurality of silicone plugs.

* * * * *